(12) United States Patent
Rak et al.

(10) Patent No.: US 7,322,759 B2
(45) Date of Patent: Jan. 29, 2008

(54) KEYBOARD APPARATUS

(75) Inventors: Roman Peter Rak, Waterloo (CA); Timothy H. Kyowski, Brantford (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 10/896,705

(22) Filed: Jul. 22, 2004

(65) Prior Publication Data

US 2006/0018699 A1 Jan. 26, 2006

(51) Int. Cl.
*B41J 5/00* (2006.01)

(52) U.S. Cl. ............... 400/486; 400/472; 400/489; 341/22

(58) Field of Classification Search ........... 400/485, 400/486, 472, 489; 345/168, 169
See application file for complete search history.

(56) References Cited

U.S. PATENT DOCUMENTS

| | | | |
|---|---|---|---|
| 4,256,931 A | 3/1981 | Palisek | |
| 4,449,839 A | 5/1984 | Bleuer | |
| 4,579,470 A * | 4/1986 | Casey | 400/489 |
| 4,769,516 A | 9/1988 | Allen | |
| 5,332,322 A * | 7/1994 | Gambaro | 400/489 |
| 5,486,058 A | 1/1996 | Allen | |
| 5,528,235 A | 6/1996 | Lin et al. | |
| 5,841,374 A * | 11/1998 | Abraham | 341/34 |
| 5,861,823 A | 1/1999 | Strauch et al. | |
| 5,902,972 A | 5/1999 | Nestor et al. | |
| 6,157,323 A | 12/2000 | Tso et al. | |
| 6,307,537 B1 | 10/2001 | Oowada | |

(Continued)

FOREIGN PATENT DOCUMENTS

EP 0595114 * 5/1994

(Continued)

OTHER PUBLICATIONS

IBM Corp.: "Triangular Toggle Keys for Touch-Tone Phones," IBM Technical Disclosure Bulletin, Armonk, NY, USA, vol. 31, No. 1, Jun. 1988, pp. 47-49, XP 000038017.

*Primary Examiner*—Daniel J. Colilla
*Assistant Examiner*—Marissa Ferguson-Samreth
(74) *Attorney, Agent, or Firm*—Jones Day; Krishna K. Pathiyal; Robert C. Liang (57) ABSTRACT

A keyboard apparatus has two rows of multi-function keys that together bear actuation indicia for the numerals 0-9 and the letters A-Z. The actuation indicia preferably defines four rows of characters, including a first row of characters that include the numerals 0-9, and further including second, third, and fourth rows of characters that together include the letters A-Z. Summarized differently, the keyboard apparatus has rows of multi-function keys bearing actuation indicia for the numerals 0-9 and the letters A-Z. The keys in each row are vertically staggered, from the perspective of a top view in which the rows are horizontal, to define circular arrays of keys within the rows of keys. An independent feature of the keyboard apparatus is a circular array of at least six multi-function keys having triangular peripheral shapes pointing radially inward. Another independent feature of the keyboard apparatus is a multi-function key having a triangular peripheral shape and three distinct scalloped surface portions at its three corners, with the distinct scalloped surface portions bearing respective actuation indicia. The key has the peripheral shape of an equilateral triangle with rounded corners.

4 Claims, 9 Drawing Sheets

U.S. PATENT DOCUMENTS

| | | |
|---|---|---|
| 6,441,753 B1 | 8/2002 | Montgomery |
| 2001/0006587 A1 | 7/2001 | Keinonen et al. |
| 2002/0093488 A1* | 7/2002 | Habu .................. 345/168 |
| 2002/0110237 A1 | 8/2002 | Krishnan |
| 2002/0149566 A1* | 10/2002 | Sarkissian ............ 345/168 |

FOREIGN PATENT DOCUMENTS

| | | |
|---|---|---|
| WO | WO 02/101531 A1 | 12/2002 |
| WO | WO 03/056784 A2 | 7/2003 |
| WO | WO 03/063005 A1 | 7/2003 |

* cited by examiner

KEYBOARD APPARATUS

TECHNICAL FIELD

This technology relates generally to the field of input systems for electronic devices, and particularly to a keyboard that is especially well-suited for use in a hand-held mobile communication device.

BACKGROUND

Hand-held mobile communication devices are operated by the use of a keyboard. Examples of such mobile devices include cellular telephones, wireless personal digital assistants (PDAs), two-way paging devices, and others. The keyboard on the device can be actuated with the fingers of one or both of the user's hands.

SUMMARY

A keyboard apparatus comprises two rows of multi-function keys that together bear actuation indicia for the numerals 0-9 and the letters A-Z. The actuation indicia prefeably defines four rows of characters, including a first row of characters that include the numerals 0-9, and further including second, third, and fourth rows of characters that together include the letters A-Z.

Summarized differently, the keyboard apparatus comprises rows of multi-function keys bearing actuation indicia for the numerals 0-9 and the letters A-Z. The keys in each row are vertically staggered, from the perspective of a top view in which the rows are horizontal, to define circular arrays of keys within the rows of keys. An independent feature of the keyboard apparatus is a circular array of at least six multi-function keys having triangular peripheral shapes pointing radially inward.

Another independent feature of the keyboard apparatus is a multi-function key having a triangular peripheral shape and three distinct scalloped surface portions at its three corners, with the distinct scalloped surface portions bearing respective actuation indicia. The key has the peripheral shape of an equilateral triangle with rounded corners.

DETAILED DESCRIPTION

Figure 1:
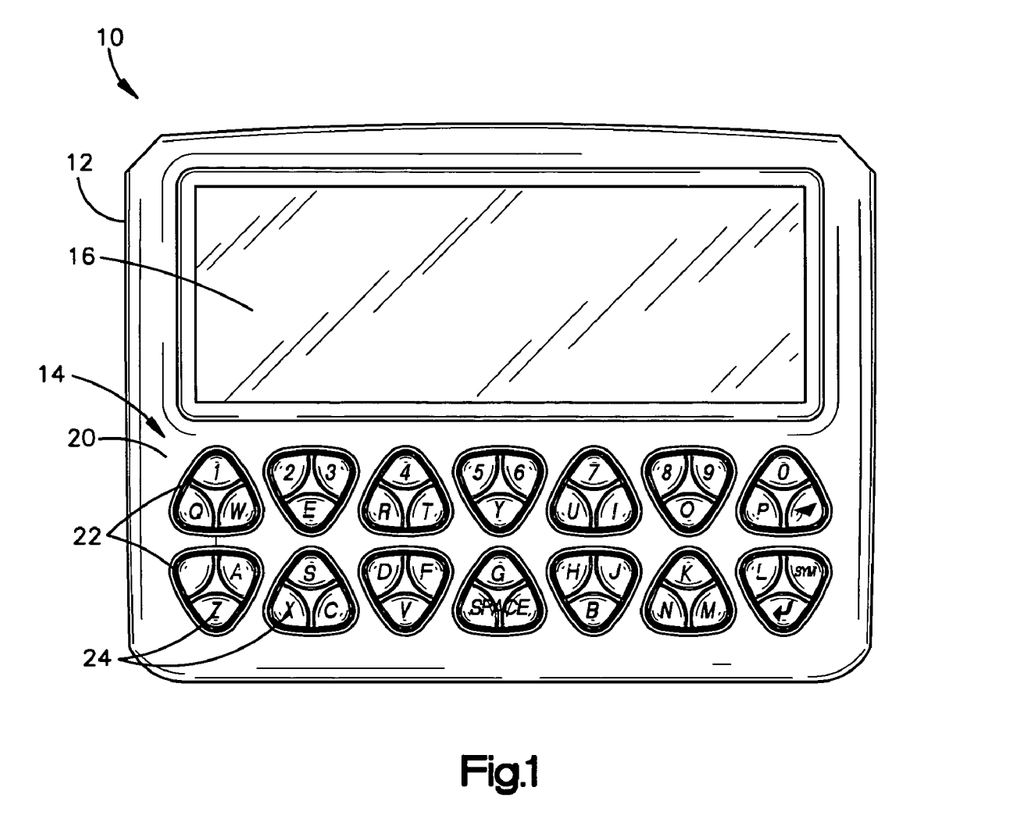
FIG. 1 is a front view of a mobile device with a keyboard.
Figure 2:
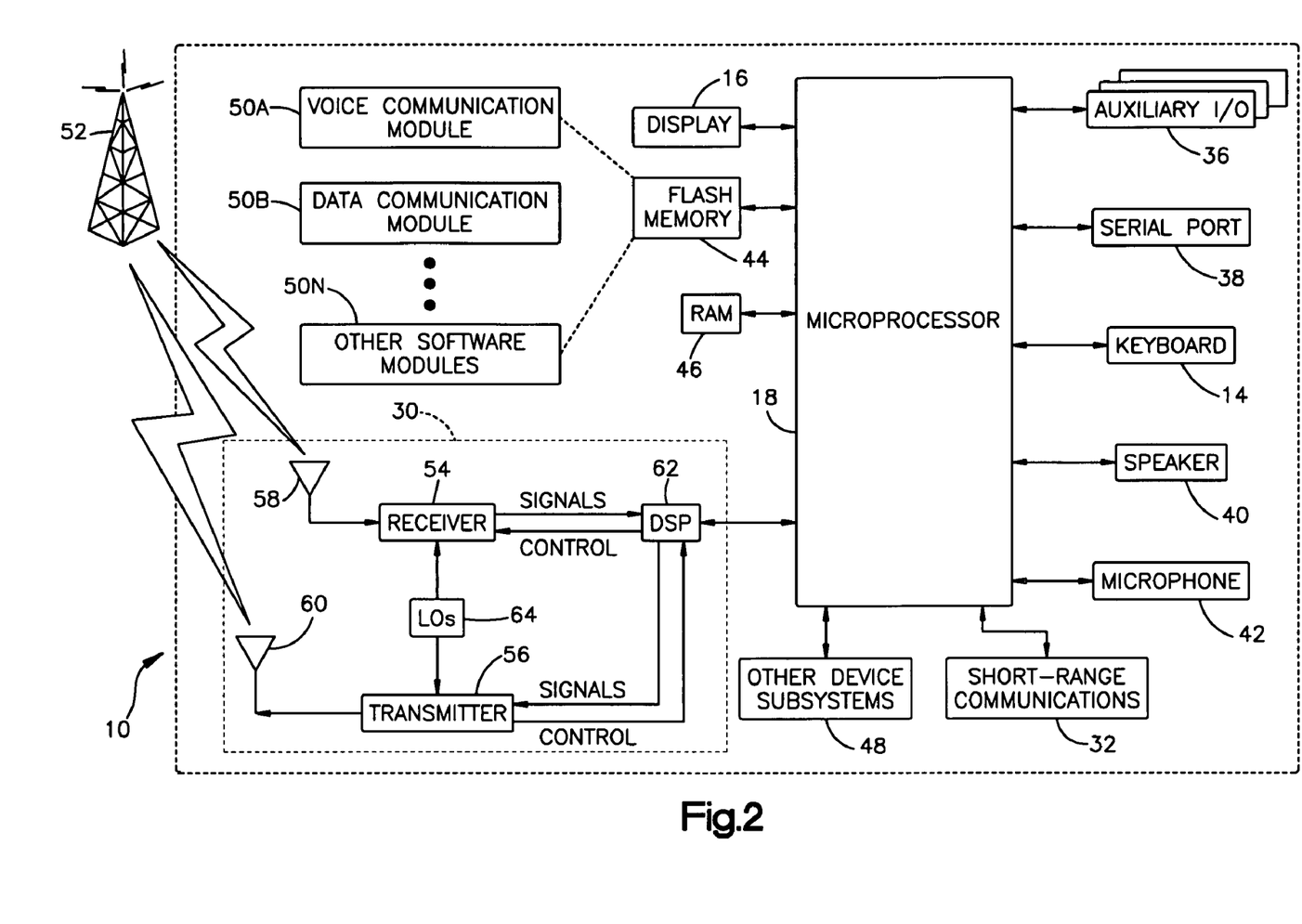
FIG. 2 is a block diagram schematically showing parts of the device of FIG. 1.

The apparatus 10 shown in FIG. 1 has parts that are examples of the elements recited in the claims. This apparatus 10 is a hand-held mobile communication device including a housing 12, a keyboard 14 and an output device 16. As shown in FIG. 1, this example of an output device is a display 16, which is preferably a full graphic LCD. A processing device 18, which is shown schematically in FIG. 2, is contained within the housing 12. The processing device 18 controls the operation of the display 16, as well as the overall operation of the mobile device 10, in response to actuation of the keyboard 14 by the user.

This example of a keyboard 14 is defined in part by a front panel 20 of the housing 12, and in part by a plurality of multi-function keys 22 at the panel 20. The multi-function keys 22 and their corresponding actuation indicia 24 together enable a user to operate the mobile device 10 in a telephony mode, in a text-entry mode, or in both the telephony and text-entry modes.

Operation

The mobile device 10 is operative as indicated schematically in FIG. 2. In addition to the processing device 18, other parts of the mobile device 10 also are shown schematically in FIG. 2. These include a communications subsystem 30; a short-range communications subsystem 32; the keyboard 14 and the display 16, along with other input/output devices 36, 38, 40 and 42; as well as memory devices 44, 46 and various other device subsystems 48. The mobile device 10 is preferably a two-way communication device having voice and data communication capabilities and preferably has the capability to communicate with other computer systems via the Internet.

Operating system software executed by the processing device 18 is preferably stored in a persistent store, such as a flash memory 44, but may be stored in other types of memory devices, such as a read only memory (ROM) or similar storage element. In addition, system software, specific device applications, or parts thereof, may be temporarily loaded into a volatile store, such as a random access memory (RAM) 46. Communication signals received by the mobile device 10 also may be stored to the RAM 46.

The processing device 18, in addition to its operating system functions, enables execution of software applications 50A-50N on the device 10. A predetermined set of applications that control basic device operations, such as data and voice communications 50A and 50B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 52. Preferably, the PIM data items are seamlessly integrated, synchronized and updated via the wireless network 52 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 30, and possibly through the short-range communications subsystem 32. The communication subsystem 30 includes a receiver 54, a transmitter 56, and one or more antennas 58 and 60. In addition, the communication subsystem 30 also includes a processing module, such as a digital signal processor (DSP) 62, and local oscillators (LOs) 64. The specific design and implementation of the communication subsystem 30 is dependent upon the communication network in which the mobile device 10 is intended to operate. For example, the mobile device 10 may include a communication subsystem 30 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 52. Signals received from the communication network 52 by the antenna 58 are routed to the receiver 54, which provides for signal amplification, frequency down conversion, filtering, channel selection, etc., and may also provide analog to digital conversion. Analog-to-digital conversion of the received signal allows the DSP 62 to perform more complex communication functions, such as demodulation and decoding. In a similar manner, signals to be transmitted to the network 52 are processed (e.g. modulated and encoded) by the DSP 62 and are then provided to the transmitter 56 for digital to analog conversion, frequency up conversion, filtering, amplification and transmission to the communication network 52 (or networks) via the antenna 58.

In addition to processing communication signals, the DSP 62 provides for control of the receiver 54 and the transmitter 56. For example, gains applied to communication signals in the receiver 54 and transmitter 56 may be adaptively controlled through automatic gain control algorithms implemented in the DSP 62.

In a data communication mode, a received signal, such as a text message or web page download, is processed by the communication subsystem 30 and is input to the processing device 18. The received signal is then further processed by the processing device 18 for an output to the display 16, or alternatively to some other auxiliary I/O device 36. A device user may also compose data items, such as e-mail messages, using the keyboard 14 and/or some other auxiliary I/O device 36, such as a touchpad, a rocker switch, a thumbwheel, or some other type of input device. The composed data items may then be transmitted over the communication network 52 via the communication subsystem 30.

In a voice communication mode, overall operation of the device is substantially similar to the data communication mode, except that received signals are output to a speaker 40, and signals for transmission are generated by a microphone 42. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem 32 enables communication between the mobile device 10 and other proximate systems or devices, which need not necessarily be similar devices. For example, the short-range communications subsystem 32 may include an infrared device and associated circuits and components, or a Bluetooth™ communication module to provide for communication with similarly-enabled systems and devices.

The mobile device 10 may also include a predictive text computer program that is used in conjunction with the keyboard 14. A predictive text computer program may, for example, be used to predict a complete word or phrase from one or more keystrokes. If the predictive text computer program does not successfully predict a desired word or phrase, then text-entry characters may be entered more completely, albeit more slowly, by selecting the appropriate characters on the keys 22.

Keyboard Structure

Figure 3:
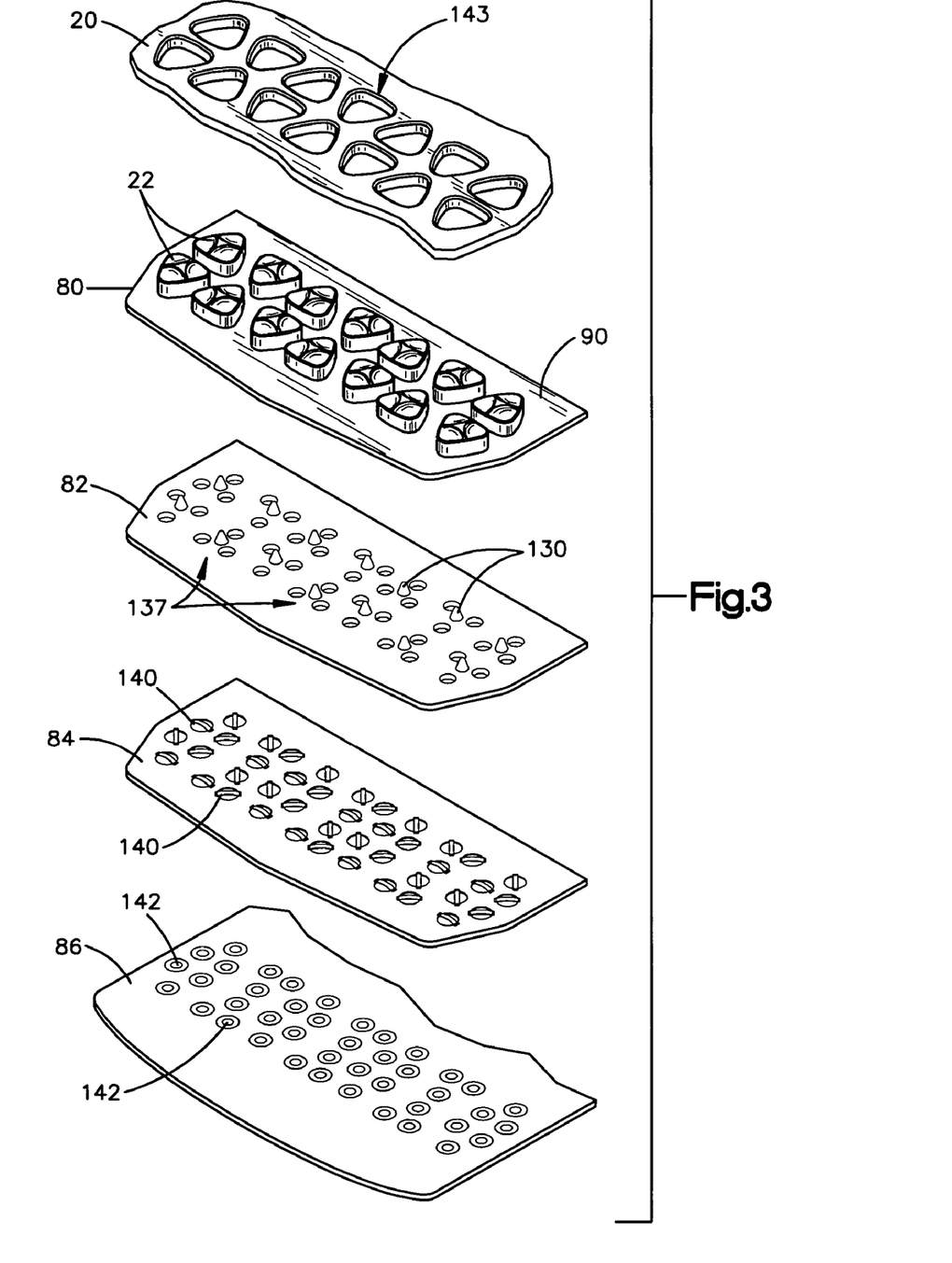
FIG. 3 is an exploded view of parts of the device of FIG. 1.
Figure 4:
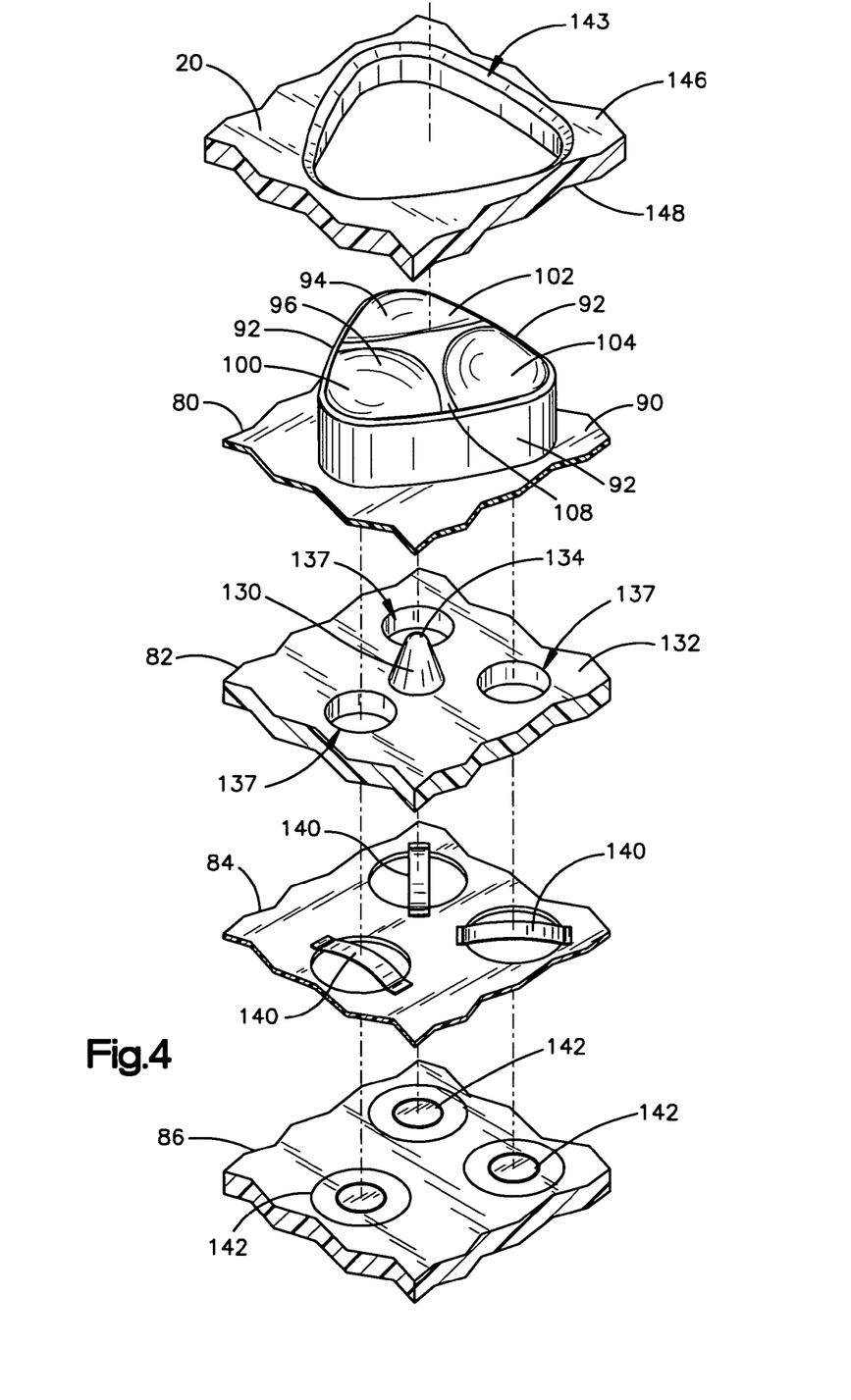
FIG. 4 is an exploded view showing enlarged portions of the parts shown in FIG. 3.

The internal structure of the keyboard 14 is illustrated in FIG. 3. This includes a molded plastic sheet 80 that defines the keys 22, an underlying chassis 82 that supports the keys 22, and a dome actuator panel 84 beneath the chassis 82. The dome actuator panel 84 overlies a printed circuit board (PCB) 86.

The keys 22 are formed as raised portions of the molded plastic sheet 80 that project upward from a thin planar base portion 90. Every key 22 has the same size and shape. Each key 22 on the sheet 80 thus has the configuration of the individual key 22 that is shown in enlarged detail in FIGS. 4-8.

Figure 6:
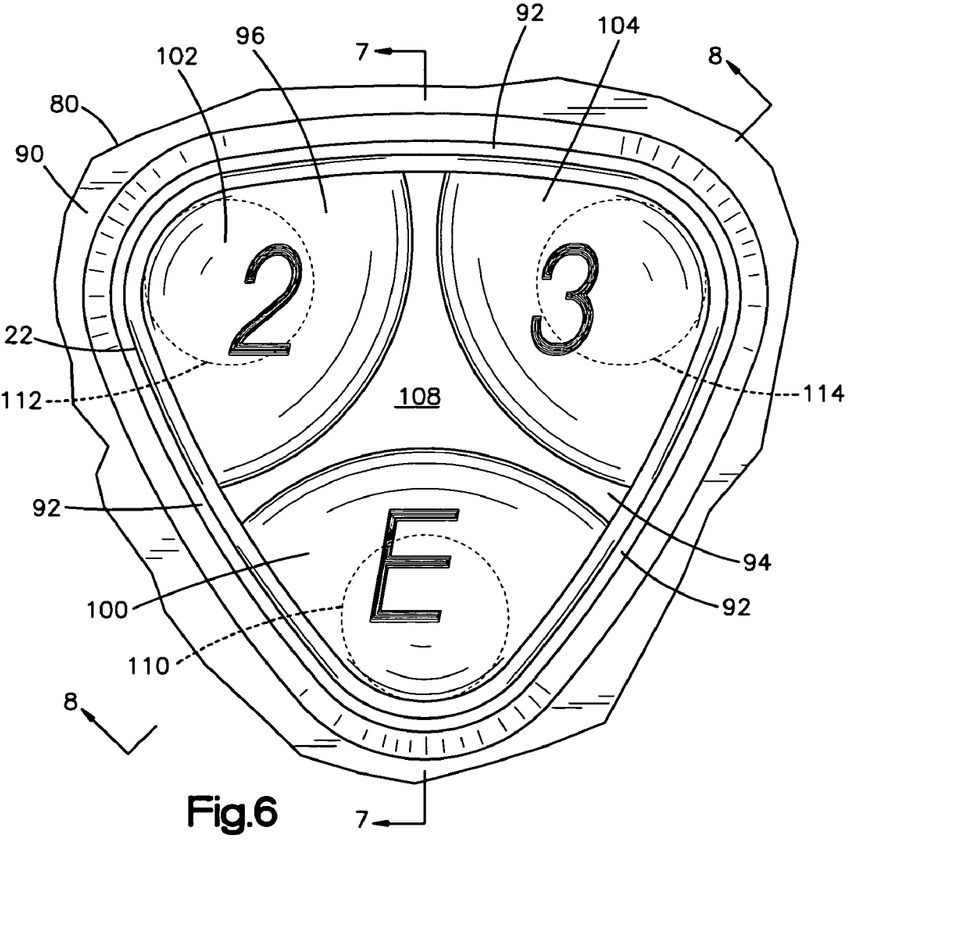
FIG. 6 is an enlarged front view of parts shown in FIG. 1.

Three side walls 92 of the key 22 project vertically from the base portion 90 of the plastic sheet 80. The side walls 92 provide the key 22 with the peripheral shape of an equilateral triangle with rounded corners, as best shown in FIG. 6. A top wall 94 of the key 22 has an actuation surface 96 upon which the actuation indicia 24 (FIG. 1) appears. The contour of the actuation surface 96 defines distinct surface portions that correspond to the actuated positions of the key 22. In this example, the actuation surface 96 is recessed from an otherwise dome-shaped contour at three distinct portions 100, 102 and 104. These portions 100, 102 and 104 of the actuation surface 96 all have the same size and shape, as best shown in FIG. 6. Specifically, each has a concave scalloped configuration that occupies nearly one third of the actuation surface 96. They are located at the three corners of the actuation surface 96, and are separated from each other by the three generally distinct branches of a non-recessed portion 108 of the actuation surface 96, as shown fully in the front view of FIG. 6.

Figure 5:
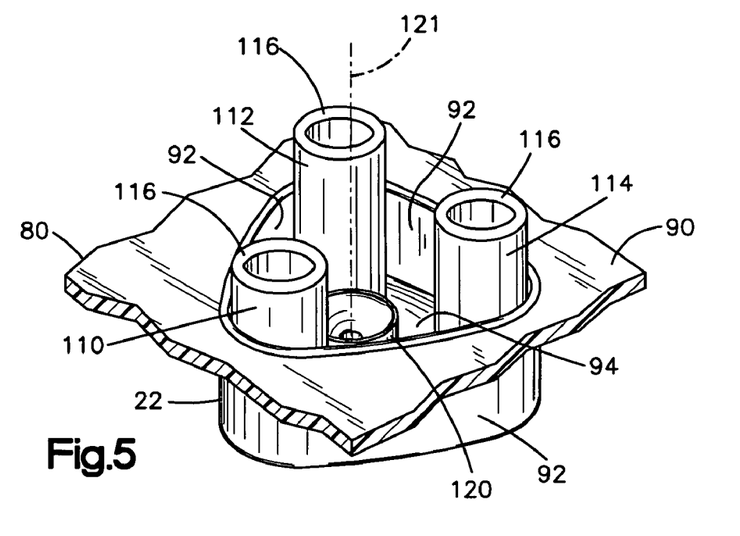
FIG. 5 is an inverted view of a part that is shown in an upright position in FIG. 4.
Figure 7:
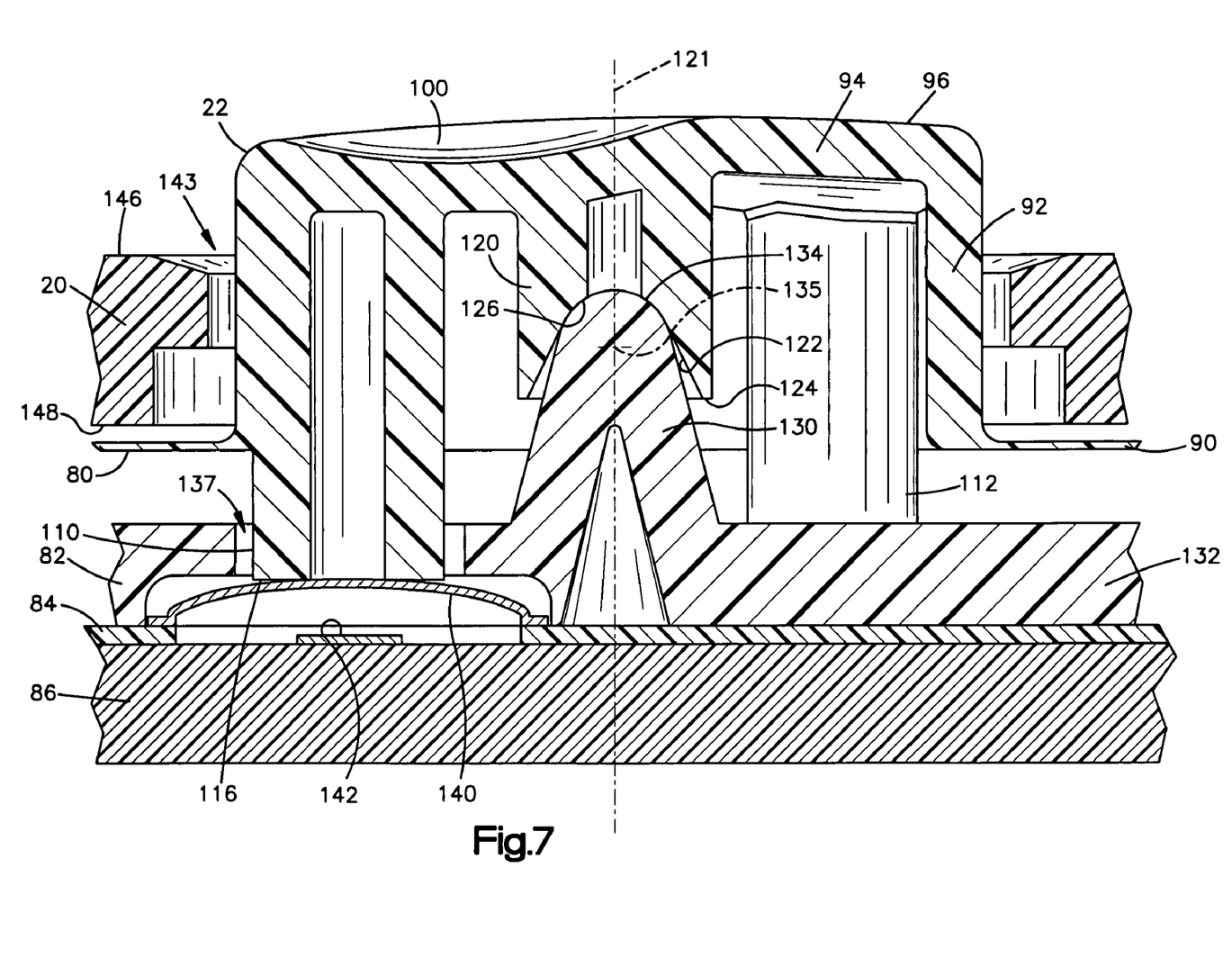
FIG. 7 is a sectional view taken on line 7-7 of FIG. 6.
Figure 8:
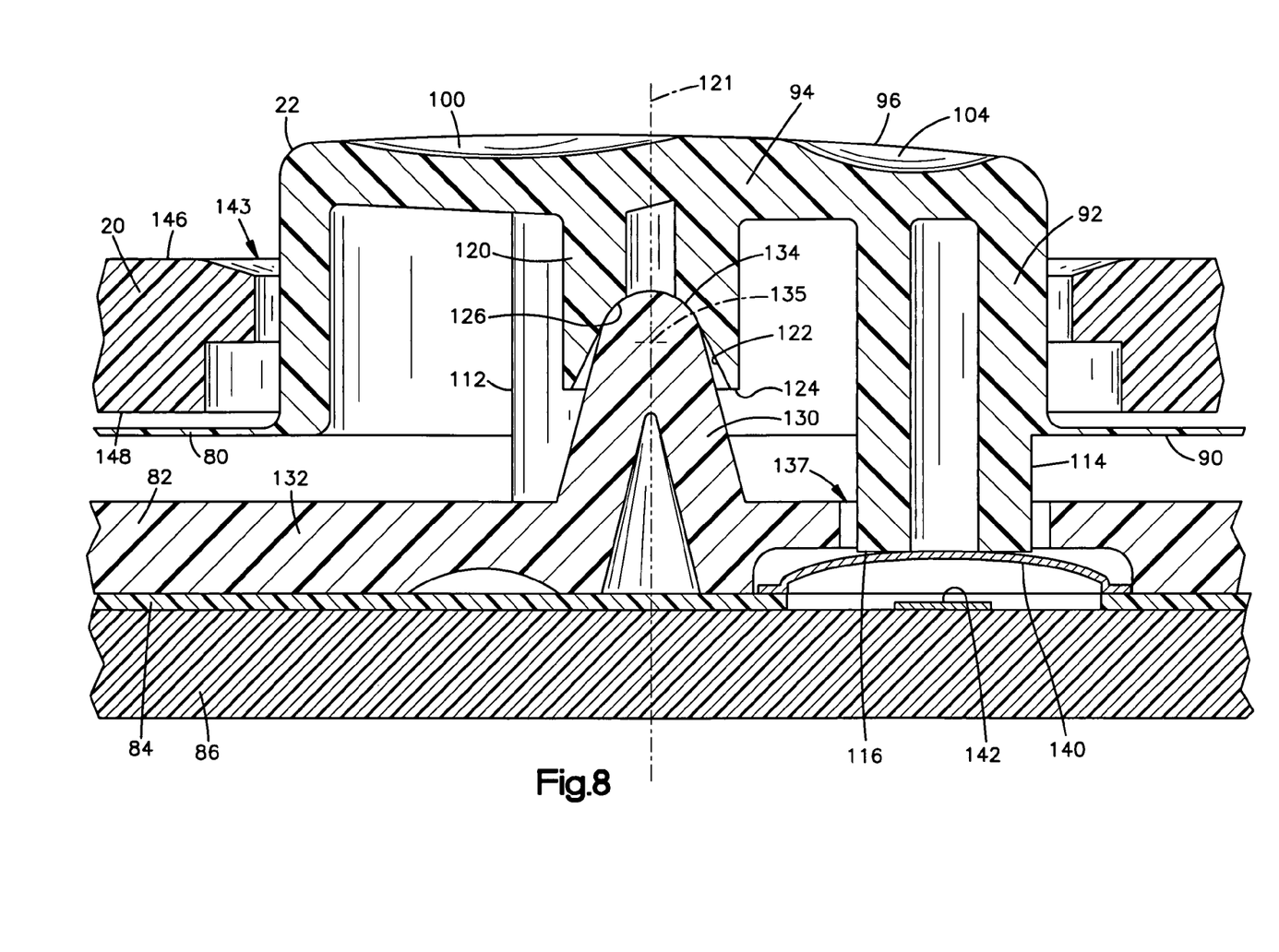
FIG. 8 is a sectional view taken on line 8-8 of FIG. 6.

As further shown in FIGS. 5, 7 and 8, the key 22 has a group of cylindrical plungers 110, 112 and 114. The plungers 110, 112 and 114 have lower ends 116 that are equally spaced vertically downward from the base portion 90 of the molded plastic sheet 80. The three plungers 110, 112 and 114 are located at the three corners of the key 22, and extend vertically downward from the top wall 94 at locations directly beneath the three actuation surface portions 100, 102 and 104, respectively.

A cylindrical bearing structure 120 also extends vertically downward from the top wall 94 of the key 22. However, the bearing structure 120 does not reach vertically downward to the bottom of the side wall 92, and is centered on a vertical axis 121 at the center of the top wall 94. A concave inner surface 122 (FIG. 7) of the bearing structure 120 faces axially downward through the open lower end 124 of the bearing structure 120. A portion 126 of the concave inner surface 122 has a spherical contour.

The chassis 82 helps to prevent the user from moving any of the keys 22 into more than one actuated position at a time. In this example, the chassis 82 is a unitary plastic part that includes a plurality of posts 130 projecting vertically upward from a panel 132. Every post 130 has the same size and shape which, as best shown in FIG. 7, is conical with a spherical upper end surface 134 centered on a pivot point 135. The radius of curvature of the spherical upper end surface 134 is equal to the radius of curvature of the spherical inner surface portion 126 of the bearing structure 120 on the key 22. Any one or more of the posts 130 could function as a light pipe if the chassis 82 were formed of a suitable plastic material and provided with a source of light.

The number and arrangement of the posts 130 on the chassis 82 are the same as the number and arrangement of the bearing structures 120 on the keys 22. Each post 130 is surrounded by a respective group of three apertures 137 that extend through the panel 132. The number and locations of the apertures 137 beside the posts 130 on the chassis 82 are the same as the number and locations of the plungers 110, 112 and 114 beside the bearing structures 120 on the keys 22. In the same arrangement, the dome actuator panel 84 has groups of three dome actuator switches 140 that overlie corresponding groups of three contact structures 142 on the PCB 86. This enables each key 22 on the sheet 80 to fit together with the chassis 82, the dome actuator panel 84 and the PCB 86 in the operatively interconnected relationship shown in the sectional views of FIGS. 7 and 8. At each key 22, the three plungers 110, 112 and 114 extend through the corresponding group of three apertures 137 in the chassis panel 132. The lower ends 116 of the three plungers 110, 112 and 114 rest on the corresponding group of three dome actuator switches 140. The key 22 projects upward through a bezel opening 143 in the housing panel 20, and the actuation surface 96 at the top of the key 22 is spaced upward from the housing panel 20. The spherical inner surface 122 of the key 22 rests on the spherical upper end surface 134 of the corresponding post 130. Preferably, the pivot point 135 is located vertically between the upper and lower side surfaces 146 and 148 of the housing panel 20.

A user of the mobile device 10 can move the key 22 to an actuated position by manually engaging any one of the actuation surface portions 100, 102 and 104 at the top of the key 22. For example, if the user manually applies a force downward against the key 22 at the first actuation surface portion 100, the panel portion 90 of the plastic sheet 80 will deflect to allow the key 22 to move relative to the other parts shown in FIGS. 7 and 8. The spherical inner surface 126 of the key 22 will then slide on the spherical upper end surface 134 of the post 130 so that the key 22 moves pivotally about the pivot point 135. The first plunger 110, which is located directly beneath the first actuation surface portion 100, then moves downward through its aperture 137 in the chassis panel 132 to deflect the underlying dome actuator switch 140 into engagement with the corresponding contact structure 142 on the PCB 86. This provides the processing device 18 (FIG. 2) with input corresponding to the indicia 24 on the first actuation surface portion 100 of the key 22. The processing device 18 is alternatively provided with input corresponding to the indicia on either of the other two actuation surface portions 102 and 104 by depressing either of those surface portions 102 and 104, and thereby to press the respective plunger 112 or 114 against the corresponding switch 140 in the same manner. In each case, the key 22 is returned to the rest position by the return spring action of the switch 140 when the user releases the key 22. Although the chassis 82 could be omitted, it is preferably included in the keyboard 14, as shown in the drawings and described above, to help prevent the user from moving more than one of the plungers 110, 112 and 114 on a key 22 into actuating contact with the corresponding switches 140 at the same time.

As noted above, the keys 22 and their actuation indicia 24 enable a user to operate the mobile device 10 in a telephony mode, in a test-entry mode, or in both the telephony and text-entry modes. In the example of FIG. 1, the keyboard 14 has multi-function keys 22 that together bear actuation indicia 24 for a complete QWERTY array of functions, numerals 0-9, and letters A-Z. Rather than having a standard telephone keypad arrangement in which the numerals 1-9 are arranged in three rows above the numeral 0, the numerals for the telephony mode of operation extend across the top of the QWERTY array in order from 0-9, and further serve as the actuation indicia for numerals in text.

Figure 9:
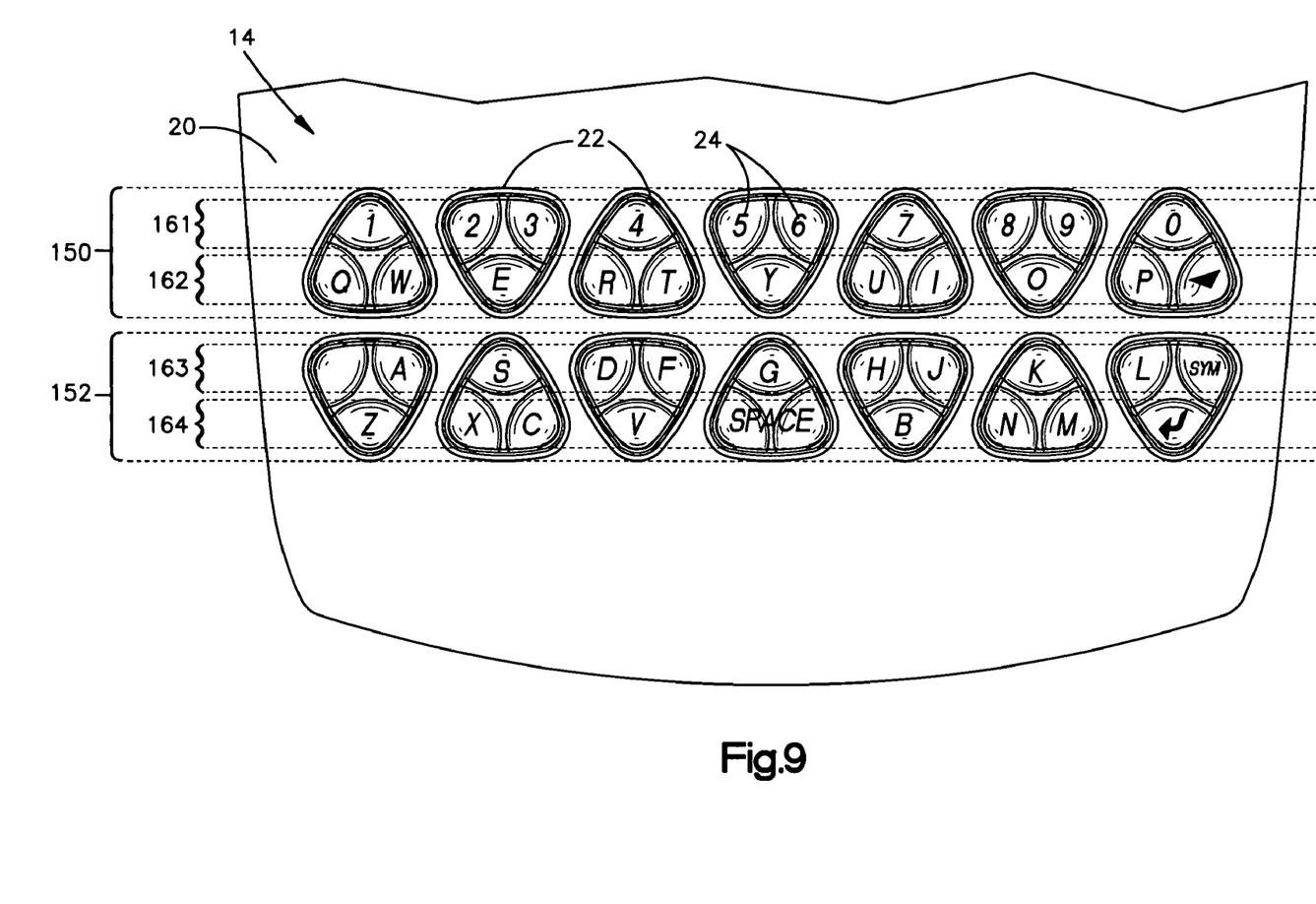
FIG. 9 is an enlarged view of the keyboard shown in FIG. 1.

As indicated in FIG. 9, the keys 22 are arranged in two rows 150 and 152, and the adjacent keys in each row 150 and 152 are inverted relative to each other. The keyboard 14 thus has two rows 150 and 152 of multi-function keys 22 bearing actuation indicia 24 defining four rows 161, 162, 163 and 164 of characters. These include a first row 161 of characters for the numerals 0-9, and further include second, third and fourth rows 162, 163 and 164 that together include the characters A-Z along with various functional characters that complete the QWERTY array.

Figure 10:
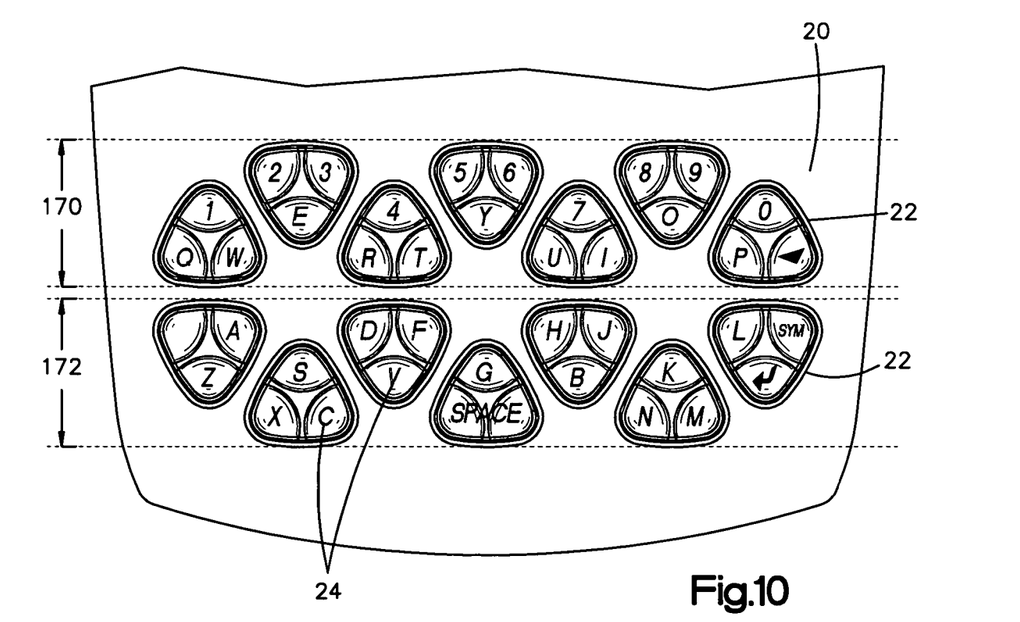
FIG. 10 is a front view of an alternative keyboard for a mobile device.

An alternative arrangement for the keys 22 on the keyboard 14 is shown in FIG. 10. As described above, the keys 22 of FIG. 9 are arranged in two rows. The keys 22 of FIG. 10 also are arranged in two rows. A "row" of keys is defined here as a linear array of keys in which keys that are adjacent to each other along the length of the array have positions that overlap at least partially across the width of the array. From the perspective of the top view of FIG. 9, each of the two rows 150 and 152 of keys 22 has a horizontal length and a vertical width, and the keys that are adjacent to each other along the length of each row 150 and 152 have positions that overlap fully across the width of the row 150 or 152. In this respect the two horizontally elongated rows 170 and 172 of keys 22 that are shown in FIG. 10 differ from the rows 150 and 152 of FIG. 9 because the keys 22 that are adjacent to each other in those rows 170 and 172 are shown to have positions that overlap only partially across the width of the row 170 or 172. In other words, the keys 22 in each of those two rows 170 and 172 are vertically staggered, whereas the keys 22 in each of the other two rows 150 and 152 are vertically level.

Figure 11:
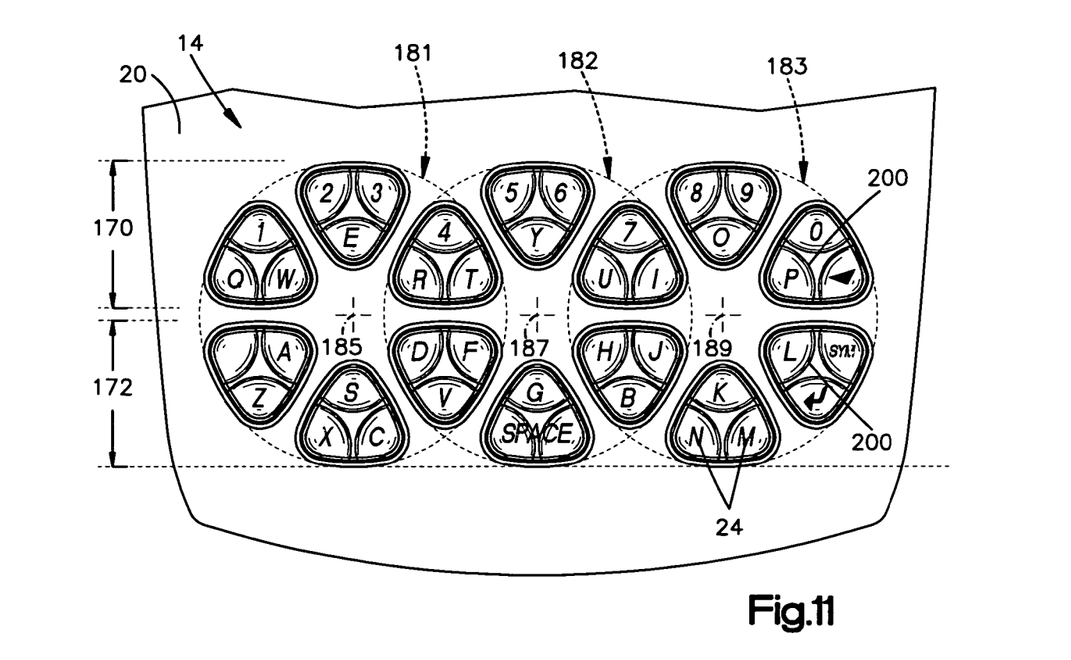
FIG. 11 is another front view of the keyboard of FIG. 10.

As further shown in FIG. 11, the inverted staggered positions of the keys 22 in the two rows 170 and 172 presents the appearance of three distinct circular arrays 181, 182 and 183 within the two rows 170 and 172. The circular arrays 181, 182 and 183 also are arranged in a horizontal row, and overlap such that the second array 182 is defined in part by keys 22 in the first and third arrays 181 and 183. The inverted positions of the triangular keys 22 contribute to the circular appearance of the three arrays 181, 182 and 183 because the keys 22 are thus arranged to point radially inward toward the centers 185, 187 and 189 of the three arrays 181, 182 and 183. The actuation surfaces 96 at the tops of the keys 22 also contribute to the circular appearance of these three arrays 181, 182 and 183. This is because the scalloped actuation surface portions 100, 102 or 104 at the radially inner corners of the keys 22 likewise point radially inward, and further have arcuate edges 200 that together give the visual impression of a circle.

This written description sets forth the best mode of the claimed keyboard apparatus, and describes the claimed keyboard apparatus to enable a person of ordinary skill in the art to make and use it, by presenting examples of the elements recited in the claims. The patentable scope of the keyboard apparatus is defined by the claims, and may include other examples that occur to those skilled in the art. Such other examples, which may be available either before or after the application filing date, are intended to be within the scope of the claims if they have structural elements that do not differ from the literal language of the claims, or if they include equivalent structural elements with insubstantial differences from the literal language of the claims.

The invention claimed is:

1. A keyboard apparatus comprising:

two rows of multi-function keys that together bear actuation indicia for the numerals 0-9 and the letters A-Z;

wherein each pair of adjacent keys in each of the two rows of keys are vertically staggered relative to each other from the perspective of a top view in which the rows are horizontal;

wherein the two rows of keys together define circular arrays of keys; and wherein the two rows of keys together define a total of three circular arrays of keys.

2. A hand held electronic device that includes the keyboard apparatus of claim 1.

3. A keyboard apparatus comprising:

two rows of multi-function keys that together bear actuation indicia for the numerals 0-9 and the letters A-Z;

wherein each pair of adjacent keys in each of the two rows of keys are vertically staggered relative to each other from the perspective of a top view in which the rows are horizontal;

wherein the two rows of keys together define circular arrays of keys; and wherein each circular array of keys partially overlaps an adjacent circular array of keys.

4. A hand held electronic device that includes the keyboard apparatus of claim 3.

* * * * *